United States Patent [19]

Moran, III

[11] Patent Number: 5,223,006
[45] Date of Patent: Jun. 29, 1993

[54] AIR CLEANER BOX FOR A COMPUTER

[76] Inventor: Charles H. Moran, III, 6700 Reynard Dr., Springfield, Va. 22312

[21] Appl. No.: 429,810

[22] Filed: Oct. 31, 1989

[51] Int. Cl.$^5$ ............................................. B03C 3/01
[52] U.S. Cl. ...................................... 55/124; 55/139; 55/385.6; 174/16.1
[58] Field of Search .............. 55/141, 143, 139, 385.4, 55/124, 385.6, 385.1; 98/1; 174/16.1; 361/384; 360/97.02, 97.03, 97.04

[56] References Cited

U.S. PATENT DOCUMENTS

| | | | |
|---|---|---|---|
| 3,284,148 | 3/1966 | Raminceanu | 312/209 |
| 3,469,031 | 11/1969 | Setchell | 178/7.9 |
| 3,654,747 | 4/1972 | Remick | 55/126 |
| 4,202,676 | 2/1980 | Pelosi, Jr. et al. | 55/269 |
| 4,268,282 | 4/1981 | MacKenzie | 55/101 |
| 4,489,356 | 3/1984 | Farmer | 360/97 |
| 4,534,776 | 5/1985 | Mammel et al. | 55/136 |
| 4,702,154 | 10/1987 | Dodson | 98/1 |
| 4,739,445 | 4/1988 | Tragen | 174/16.1 |
| 4,751,872 | 6/1988 | Lawson | 98/1 |
| 4,784,675 | 7/1988 | Lebert et al. | 55/213 |
| 4,860,163 | 8/1988 | Sarath | 361/84 |
| 4,889,542 | 12/1989 | Hayes | 174/16.1 |

FOREIGN PATENT DOCUMENTS 59-213438 12/1984 Japan .
931625 7/1963 United Kingdom .................. 55/124

*Primary Examiner*—Bernard Nozick
*Attorney, Agent, or Firm*—Wigman, Cohen, Leitner & Myers

[57] ABSTRACT

An air cleaner box for a computer or other electronic equipment is disclosed in which the computer or other electronic equipment is inserted into an enclosure which is sealed from the outside environment in such a manner that all of the air entering the enclosure must do so through an electronic or other type of air cleaner which serves to remove the dirt, dust, smoke and other air borne contaminants from the environment before they reach the electronic equipment contained in the enclosure. The enclosure contains within it all of the equipment for operating the air cleaner filter as well as a cable access box which allows computer cables to be routed from the outside environment into the contaminant-free enclosure while providing a tight seal against air infiltration from the outside environment.

12 Claims, 2 Drawing Sheets

AIR CLEANER BOX FOR A COMPUTER

BACKGROUND OF THE INVENTION

The present invention relates generally to providing a clean and contaminant free environment for electronic machinery. More particularly, the present invention relates to an apparatus for providing a clean and uncontaminated environment for a computer.

With the proliferation and rapid advancement of computers into business environments, computers, and particularly personal computers and minicomputers are no longer being used in environments in which the atmosphere is tightly controlled with respect to temperature and contaminants. In the past, computers were generally located in so-called computer clean rooms, in which the temperature of the room and the cleanliness of the air within the room were carefully maintained. However, with the advent of small powerful computers, and particularly personal computers, computers are now often found in both office and other environments in which the temperature of the environment may be only generally regulated and in which there is no regulation of the cleanliness of the air within the environment.

That is particularly true in the case of computers used in other than office environments, such as in manufacturing and other areas in which the computers are utilized in environments subject to air contamination and pollution. Often, the air pollution is generated by workers' smoking of cigarettes or other tobacco products which produce particulates which can be particularly damaging to both the circuitry and other components utilized with computers.

In work environments in which the computers are utilized in conjunction with a manufacturing or equipment repairing or preparing facility, even if such computers are located in the office portions of a shared facility, they are still subject to being exposed to air borne contaminants generated by those manufacturing and other service work facilities. Under such conditions, the circuitry and/or peripheral components, such as hard disk drives frequently used with computers, are subject to premature failure. Thus, there is a great need for a small portable device which provides an environment for a personal computer which protects it from such air borne contaminants.

One prior art approach to providing relatively dust-free air to cool electronic equipment is disclosed in U.S. Pat. No. 4,534,776 issued on Aug. 13, 1985 to Mammel et al., which discloses an air cleaner which is utilized to clean air before it enters into a room housing the equipment to be cooled. The room air enters the filter at one side of the room, is filtered and then is passed into the room by means of a fan located within the room. The dirty air from the room is exhausted by another fan.

Another prior art approach is shown in U.S. Pat. No. 4,784,675, issued Nov. 15, 1988, to Leber et al. The Leber et al. disclosure shows a cabinet controller in which the cabinet or housing is provided with an outside mounted cleaning apparatus for filtering the air entering the housing. The cabinet controller, which can operate automatically to control various parameters within the environment of the cabinet, is designed for use in industries in which the environment is hostile to electric equipment. While both the Mammel et al. and Leber et al. disclosures are designed to provide a clean environment in which to operate sensitive electronic equipment, neither of those two patents disclose an enclosure which incorporates within its confines the air filtration and cleaning systems utilized. Neither of those two references discloses a device which is designed as a portable enclosure or which may house a portable piece of computer equipment.

Other efforts to produce clean environments are also known in the prior art. For example, U.S. Pat. No. 4,268,282, issued May 19, 1981 to MacKenzie, U.S. Pat. No. 3,284,148, issued Nov. 8, 1966 to Ramniceanu and Japanese Patent Application No. 59-213438, are all directed to work benches which filter the air before it reaches the enclosed work platform. However, those devices are not designed for use in operating portable electronic equipment and suffer from many of the same disadvantages discussed above in connection with the Leber et al. and Mammel et al. disclosures.

Another prior art attempt to provide a clean environment for use with a television set is disclosed in U.S. Pat. No. 3,469,031, issued Sep. 23, 1969, to Setchell, which discloses a combination television set and electronic air cleaner. That device, however, is simply not contemplated to be for use with other electronic circuitry. Rather, it is designed for use specifically with a television receiving set and to take advantage of the fact that television sets have certain of the same electronic components necessarily used with electronic air cleaners.

SUMMARY AND OBJECTS OF THE INVENTION

In view of the foregoing, it should be apparent that there still exists a need in the art for a portable apparatus for providing a clean environment in which a piece of portable electronic equipment and, in particular, a personal computer, may be operated in a simple and inexpensive manner. It is, therefore, a primary object of this invention to provide an apparatus for producing a contamination free environment in which portable electronic equipment may be operated which is characterized by simple construction and which has particular application for both personal computers and minicomputers.

More particularly, it is an object of this invention to provide a clean air environment as aforesaid which utilizes simple and reliable filtering equipment which does not require frequent servicing nor the use of costly components.

Still more particularly, it is an object of this invention to provide an apparatus for producing a clean air environment which may be readily moved from place to place within the work environment and which isolates the electronic equipment placed within the apparatus of the present invention from the air in the work environment.

A further object of the present invention is to provide an apparatus for producing a clean air environment in which a piece of portable electronic equipment, such as a personal computer, may be readily placed such that any air borne particulate contaminants are removed from the work environment air entering the present invention prior to that air being supplied to the electronic equipment within the apparatus of the present invention.

It is a still further object of the present invention to provide an apparatus for providing a clean air environment for a personal computer or other portable electronic apparatus in which a cable access box or baffle is utilized as a part of the enclosure in order to assist in sealing the environment inside the apparatus from the contaminated air in the work environment.

Briefly described, these and other objects of the invention are accomplished by providing a completely sealed container designed to house a computer or other piece of electronic equipment which is sensitive to dirt, dust, smoke or other air borne particulates or pollution. All air entering the enclosure must do so through an electronic or other type of filter. Environmental air enters the enclosure through a filter grill behind which is mounted an electrostatic, electronic or other type of filter cell. One or more fans are provided for exhausting air pulled into the container through the filter cell.

The controls for the filter cell and a cable access box are mounted to the inside of the enclosure. The cable access box allows computer and power cables to be routed through the enclosure in such a manner that the integrity of the sealed enclosure is maintained while at the same time allowing the use of portable electronic equipment within the enclosure.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
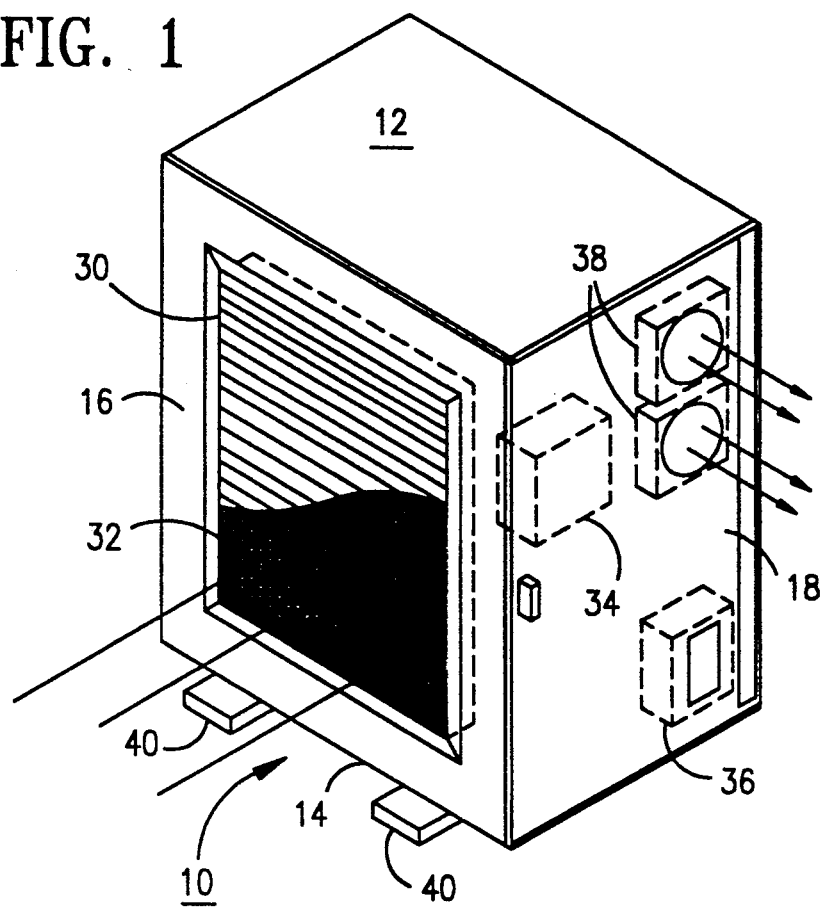
FIG. 1 is a perspective drawing showing the apparatus of the present invention.
Figure 2A:
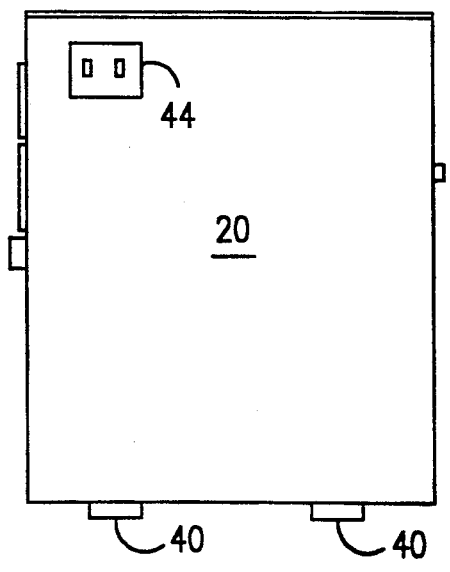
FIG. 2a is a drawing showing the left side view of the apparatus of the present invention shown in FIG. 1.
Figure 2B:
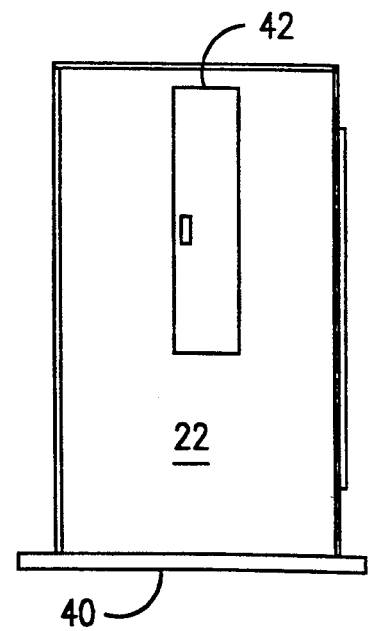
FIG. 2b is a drawing of the front view of the apparatus of the present invention shown in FIG. 1.

Referring now in detail to the drawings where like parts are designated by like reference numerals throughout, there is illustrated in FIG. 1 an air cleaner box for a computer or other portable electronic equipment which is constructed generally of an air tight housing 10 having a top 12, a bottom 14, a front 16, a right side 18 and, as shown in FIGS. 2a and 2b, a left side 20 and a front 22. The enclosure 10 may be constructed from any suitable material, such as sheets of acrylic, press board, metal, plastic or other material. What is important, however, is that the material used to construct the enclosure 10 be impervious to air and be readily available such that the enclosure 10 can be economically manufactured.

As shown in FIG. 1, the right side 16 of the enclosure 10 has mounted thereto a filter grill 30 with a hinged face which provides access to the electronic filter 32 mounted behind the grill 30. The grill 30 is mounted in a hole formed in the face of the right side 16 of the enclosure 10. The filter grill 30 may preferably be a 2" filter grill which, being hinged to the right side 16 of the enclosure 10, provides access to the electronic filter cell, which may also preferably be a 2" electronic filter, with a removable cartridge for easy maintenance. The control box 34 which contains electronic control circuitry for operating the electronic air cleaner 32 is mounted within the enclosure 10 in any suitable spot, such as to the inside surface of the rear side 18 of the enclosure 10. It is advantageous to mount the control box 34 to the rear side 18 of the enclosure 10 since the rear side 18 is hinged to the enclosure 10 for providing access to the interior of the enclosure 10. That also provides easy access to the components mounted on the rear side 18, such as the electronic air cleaner control box 34. The hinging of the rear side 18 to the enclosure 10 also provides an entrance by which the electronic equipment or computer which is to be protected by the apparatus of the present invention may be inserted into the enclosure box 10.

In order to ensure a constant air flow through the grill 30, the electronic air cleaner 32 and out of the enclosure 10, one or more electrically operated fans 38 may be mounted in the rear side or door 18 of the enclosure 10. If two fans are used, each fan preferably has a capacity of 70 cubic feet per minute, operating at 115 volts AC and 2200 RPM.

Also mounted to the rear door 18 of the enclosure 10 is a cable access box 36 which may preferably be filled with 1½ foam cut into layers. The function of the cable access box 36 is to allow the computer and any power cables to be routed from the outside contaminated environment into the inside environment, which is contaminant free due to the apparatus of the present invention, and still maintain the sealing tightness of the box of the enclosure 10. The entire enclosure 10 is mounted on a pair of feet 40 in order to provide stability for the enclosure.

It should be understood that any opening in the enclosure 10, such as that covered by the grill 30, and particularly the openings formed by the rear door 18 and, as shown in FIG. 2b, the access door 42, be provided with a seal extending along the entire length of the access door 42 or rear door 18 such that, when such doors are closed, and the fans 38 are in operation, all of the air entering the enclosure must do so through the grill 30 and thus pass through the electronic air cleaner 32.

The enclosure 10, as shown in FIG. 2a, may preferably be provided with an external pair of power switches 44 such that both the computer located inside the enclosure 10 and the electronic air cleaner 32 and fans 38 which form a part of the apparatus of the present invention can be turned on separately. Initially, it is preferable to operate the electronic air cleaner 32 and fans 38 after opening the enclosure or exposing the interior of the enclosure for any reason to the outside atmosphere. In that manner, a clean environment can be created within the enclosure 10, prior to operating the computer or other electronic equipment contained in the enclosure.

Figure 3:
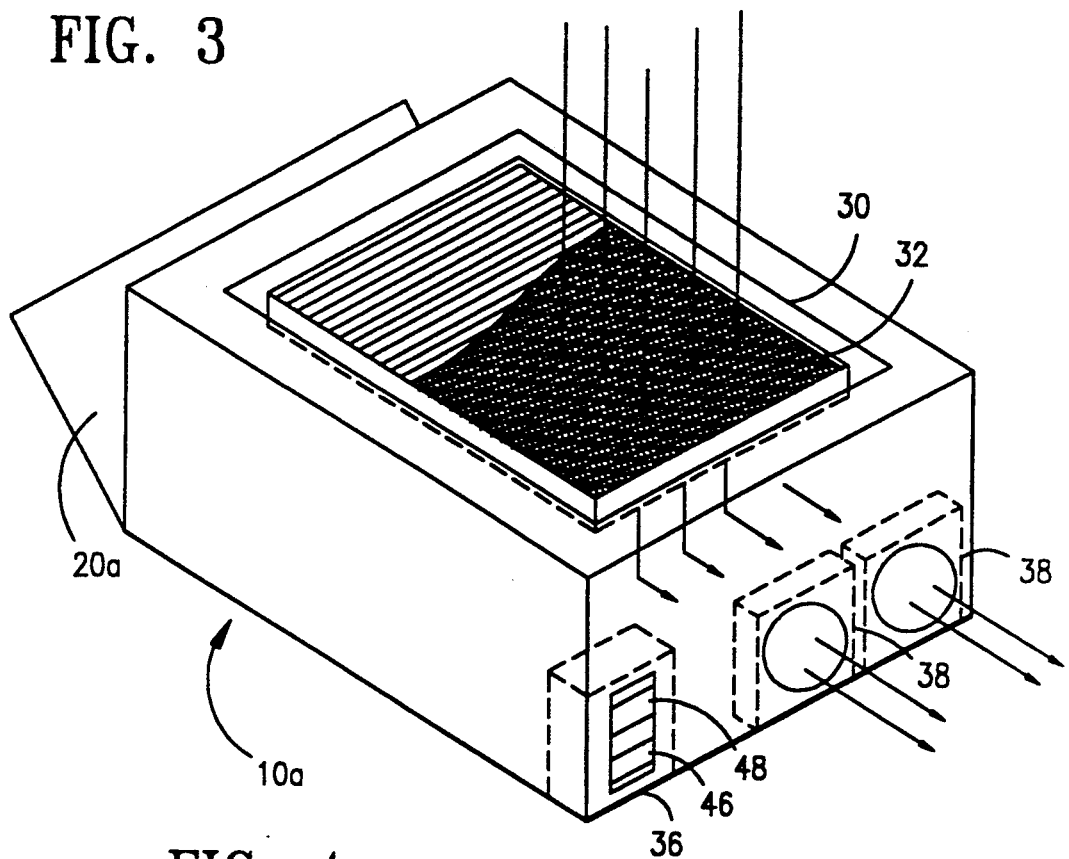
FIG. 3 is a perspective drawing of an alternate embodiment of the apparatus of the present invention.
Figure 4:
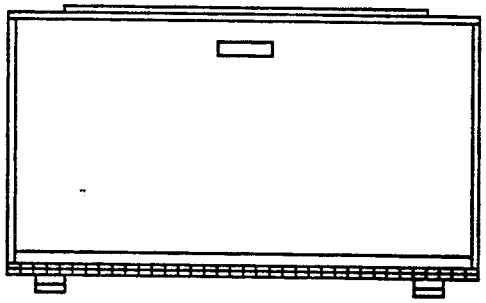
FIG. 4 is a drawing of the front view of an alternate embodiment of the apparatus of the present invention shown in FIG. 3.

FIG. 3 shows an alternate embodiment of the enclosure 10 of the present invention in which the equipment to be located within the enclosure 10 is generally of a greater width than height. For example, the enclosure 10 of FIG. 1 would preferably be used with a minicomputer or other electronic equipment which is of a height much wider than its width, whereas the enclosure 10a shown in FIG. 3 may preferably be used with a personal computer. Since the enclosure or air cleaner box 10a of FIG. 3 occupies a smaller volume than the air cleaner box 10 of FIG. 1 the two fans 38 are preferably of lower rated capacities, for example, 55 cubic feet per minute at 1800 RPM. In addition, if desired, the filter grill 30 may be constructed of a 1" filter grill and the electrostatic or electronic filter cell 32 may be either a 1" or 2" size. As shown in FIG. 3, the cable access box 36 includes a layer of foam 46, whose purpose has been previously described.

Figure 5A:
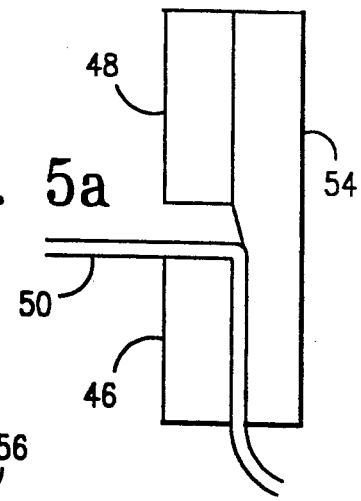
FIG. 5a is a drawing of an alternate and preferred embodiment of a cable access box for use with the present invention.
Figure 5B:
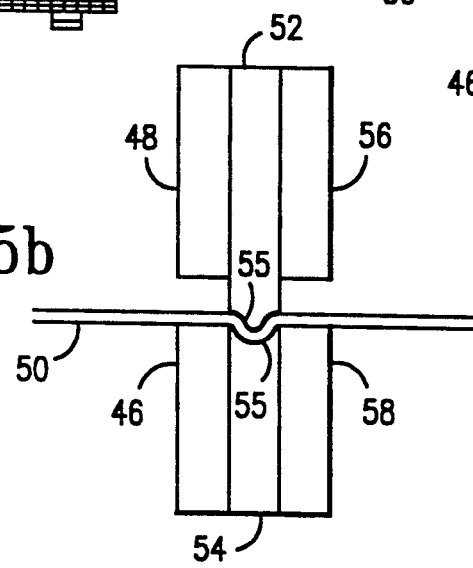
FIG. 5 is a drawing of a side view of the cable access box for use with the apparatus of the present invention.

FIGS. 5a and 5b show side views of alternate embodiments of the foam layers utilized in the cable access box 36. The foam layers may be of any desirable size, such as 1" or 1½ foam sheets. As shown in FIG. 5a, an easily constructed foam block may be fabricated from two short pieces of foam 46 and 48 which are compressed within the front and back sides of the cable access box 36 with a large piece of foam sheet 54. In that manner, computer cables 50 may be routed through an opening left between the two shorter foam pieces 46 and 48 and be pulled through the interface between either of the two foam pieces 46 and 48 and the large foam piece 54, which causes compression of the foam pieces. At the same time, those foam pieces are flexible enough to surround the cables 50. In that manner, an air tight seal around the cables 50 is maintained.

FIG. 5b shows an alternate three layer foam structure which may be utilized with the cable access box 36. In that embodiment, the same two short pieces of foam 48 and 46 are utilized and a gap is left between those two pieces of foam. The next or middle layer of foam is formed by a longer foam sheet piece 52 and a shorter foam sheet piece 54 which, when placed together with the two other foam layers in the cable access box 36, have a slit 55 of a size much smaller than the cable 50 which is to pass there through. That slit 55 is formed between those foam pieces on a different axis than the gap formed between the two front foam pieces 46 and 48 and the two rear foam pieces 56 and 58. In that manner, the computer cables 50 are passed through the gap between the two front pieces 46 and 48, through the slit 55 between the two middle foam pieces 52 and 54, which foam pieces are compressed around the cables 50 such that an airtight seal is formed. The two rear or third layer foam pieces 56 and 58, whose gap is coaxial with the gap between the two front foam pieces 46 and 48, serve to provide additional rigidity to the structure of the cable access box 36 The cables 50 exit into the inside of the enclosure 10 through the gap formed between the two foam pieces 56 and 58.

Obviously, the cable access box may be formed from other alternative structures of layered foam pieces, for example, two or more layers of foam pieces pressed together within the cable box 36 and without a slit such as that shown as element 55 of FIG. 5b. The cable being inserted into such a cable access box passes over the top of one of the layers of foam and then under the bottom of the next layer and then into the sealed container. Other alternative foam structures for use with the cable access box will readily come to mind to those of ordinary skill in the art in light of the teachings herein.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A self-contained portable enclosure for housing a portable piece of electronic equipment in an uncontaminated environment, comprising:
   a sealed enclosure having front, back, side, top and bottom wall portions;
   a first outside opening contained in one of said front, back and side wall portions for allowing outside air to enter said sealed enclosure;
   an air cleaner system sealingly secured to said wall portion directly behind said first outside opening for cleaning said air entering said sealed enclosure;
   a cable access box mounted to one of said front, back and side wall portions inside said enclosure, said cable access box including a plurality of layers of foam material through which said cables pass to reach said equipment, such that cables may enter said enclosure while still maintaining the uncontaminated environment of the inside of said enclosure; and
   a fan mounted to one of said front, back and side wall portions adjacent said first outside opening, said fan being mounted inside said enclosure and in front of a second outside opening such that all air entering the inside of said enclosure must pass through said air cleaner system and be exhausted through said second outside opening.

2. The self-contained portable enclosure of claim 1, wherein one of said back and side walls is hingedly, sealingly, attached in order to provide access to the inside of said enclosure.

3. The self-contained portable enclosure of claim 1, further including electronic control circuitry for operating said air cleaner system.

4. The self-contained portable enclosure of claim 1, wherein said air cleaner system is an electronic air cleaner.

5. The self-contained portable enclosure of claim 1, wherein said air cleaner system is an electrostatic precipitator.

6. The self-contained enclosure of claim 1, wherein said air cleaner system includes a removable filter cell.

7. An air filtering system comprising:
   a cabinet defining a sealed confined interior equipment containing space into which air from outside said cabinet is drawn through a first outside opening;
   a filter system mounted within said cabinet between said first outside opening and the interior of said cabinet such that air drawn from outside said cabinet passes through said filter system before reaching said confined interior equipment containing space;
   a fan system mounted within said cabinet in the vicinity of said filter system such that said fan system draws air from outside said cabinet through said air filter system and into said confined interior equipment containing space and then exhausts said air through a second outside opening in said cabinet to outside said cabinet; and
   cable access system mounted within said cabinet which provides an opening into said cabinet for cables to be connected to equipment housed in said confined interior equipment space, said cable access system including a sealing device which includes a plurality of layers of foam material through which said cables pass to reach said equipment to ensure that all air drawn from outside said cabinet passes through said filter system.

8. The air filtering system of claim 2, wherein said cabinet includes a hinged portion which is sealed air tight when closed and which provides access to the confined interior equipment containing space when open.

9. The air filtering system of claim 2, further including electronic control circuitry for operating said filter system.

10. The air filtering system of claim 2, wherein said filter system is an electronic air cleaner.

11. The air filtering system of claim 2, wherein said filter system is an electrostatic precipitator.

12. The air filtering system of claim 2, wherein said filter system includes a removable filter cell.

* * * * *